US011888984B2

(12) United States Patent
Bockes

(10) Patent No.: US 11,888,984 B2
(45) Date of Patent: Jan. 30, 2024

(54) WHITE-BOX ECC IMPLEMENTATION

(71) Applicant: GIESECKE+DEVRIENT MOBILE SECURITY GMBH, Munich (DE)

(72) Inventor: Markus Bockes, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 164 days.

(21) Appl. No.: 17/441,430

(22) PCT Filed: Mar. 17, 2020

(86) PCT No.: PCT/EP2020/025133
§ 371 (c)(1),
(2) Date: Sep. 21, 2021

(87) PCT Pub. No.: WO2020/192968
PCT Pub. Date: Oct. 1, 2020

(65) Prior Publication Data
US 2022/0182234 A1 Jun. 9, 2022

(30) Foreign Application Priority Data
Mar. 22, 2019 (EP) .................................... 19000143

(51) Int. Cl.
*H04L 9/30* (2006.01)
*H04L 9/00* (2022.01)
*H04L 9/08* (2006.01)

(52) U.S. Cl.
CPC ............ *H04L 9/3066* (2013.01); *H04L 9/002* (2013.01); *H04L 9/008* (2013.01); *H04L 9/0838* (2013.01); *H04L 9/0861* (2013.01); H04L 2209/16 (2013.01)

(58) Field of Classification Search
CPC ....... H04L 9/3066; H04L 9/002; H04L 9/008; H04L 9/0838; H04L 9/0861; H04L 2209/16
See application file for complete search history.

(56) References Cited

U.S. PATENT DOCUMENTS

| | | | | |
|---|---|---|---|---|
| 2003/0059041 | A1* | 3/2003 | MacKenzie | H04L 9/3218 713/180 |
| 2018/0302220 | A1* | 10/2018 | Wang | G06F 21/62 |
| 2018/0359229 | A1* | 12/2018 | Ding | H04L 63/0464 |
| 2019/0199509 | A1* | 6/2019 | Hoshizuki | G06N 3/048 |
| 2020/0052903 | A1* | 2/2020 | Lam | H04L 9/3239 |
| 2020/0058022 | A1* | 2/2020 | Ma | G06Q 20/3678 |

FOREIGN PATENT DOCUMENTS

EP 3334083 A1 6/2018

OTHER PUBLICATIONS

On the Relationship between Functional Encryption, Obfuscation and Fully Homomorphic Encryption by Alwen et al., Published 2018. (Year: 2018).*
A Guide to Fully Homomorphic Encryption, by Carr et al., Published 2015. (Year: 2015).*
International Search Report with Written Opinion from PCT Application No. EP2020/025133, dated May 14, 2020.
Extended Search Report from corresponding EP Application No. EP19000143.8, dated Aug. 22, 2019.
Sen et al., "Homomorphic Encryption—Theory and Application," Theory and Practice of Cryptography and Network Security Protocols and Technologies, ISBN: 978-953-51-1176-4, Jul. 17, 2013, pp. 1-31.
Youn et al., "Design of additive homomorphic encryption with multiple message spaces for secure and practical storage services over encrypted data," Journal of Supercomputing, vol. 74, Issue No. 8, Jun. 29, 2016, pp. 3620-3638.

* cited by examiner

*Primary Examiner* — Vu V Tran
(74) *Attorney, Agent, or Firm* — Workman Nydegger

(57) ABSTRACT

A microprocessor device comprising an implementation of a cryptographic operation constructed to process parameters and generate an output, wherein at least some of the parameters are obfuscated such that the cryptographic operation processes the obfuscated parameters, wherein the parameters which are obfuscated are obfuscated in that they are encrypted according to an additive homomorphic cryptographic system.

11 Claims, No Drawings

WHITE-BOX ECC IMPLEMENTATION

FIELD OF THE INVENTION

The present invention relates to cryptography, and more precisely to White Box Cryptography WBC, particularly to White Box Cryptography WBC on Elliptic Curves EC (Elliptic Curve Cryptography ECC), also referred to as EC-WBC or WBC-ECC. More precisely, the invention relates to microprocessor devices with implementations of cryptographic operations.

BACKGROUND OF THE INVENTION

A microprocessor device or context in which a cryptographic operation is implemented is often categorized as Black-Box, Grey-Box or White-Box. In a Black-Box context, an attacker has no access to the operation, for example due to use of a hermetically sealed hardware module, such that secret information processed by the cryptographic operation is protected against attacks. In a white-box context an attacker has full access to the device or context in which the cryptographic operation is implemented. He can inspect, stop, step through and modify the implementation as it is running. So appropriate countermeasures have to be implemented to protect secret information processed in the cryptographic operation.

An implementation of a cryptographic operation, as the implementation is understood in this application, can generally be in Software or Hardware or a mixture of both Hardware and Software.

1. An elliptic curve can be described as follows.
p, a, b: parameters of an elliptic curve E given by the Weierstrass equation $$y^2 = x^3 + a^*x + b \bmod p$$

G=(G.x,G.y): generator point of cyclic subgroup $\langle G \rangle \subset E$
q=ord(G)=order of point G
h: cofactor of G, i.e. q*h=ord(E)

Known cryptographic operations on an elliptic curve comprise for example: ECDSA key generation; ECDSA signature generation; ECDSA signature verification; ECDH key generation; ECDH key exchange; EC-Schnorr key generation; EC-Schnorr signature generation; EC-Schnorr signature verification. The listed examples of known cryptographic operations on an elliptic curve will be explained in the following, with notation as will be used in connection with presentation of the invention.

2.1 Standard ECDSA key generation

---

Input: -
Output: private key d, public key P
Procedure:
   Generate cryptographically secure random d in {1,2,...,q−1}
   P = d*G
   Output d, P

---

2.2 Standard ECDSA signature generation

---

Input: private key d, hash(m) of message m
Output: signature parameters r, s
Procedure:
   Generate cryptographically secure random u in {1,2,...,q−1}
   (ephemeral key)
   Calculate Q = u*G
   r = Q.x mod q. If r == 0 restart.
   s = (hash(m) + r*d) / u mod q. If s == 0 restart.
   Output r, s

---

2.3 Standard ECDSA signature verification

---

Input: public key P, hash(m) of message m, signature (r, s) to be verified
Output: TRUE if signature is valid, FALSE else
Procedure:
   Check for r, s in {1,2,...,q−1}. If not output FALSE and terminate.
   u = hash(m) / s mod q, v = r / s mod q
   Q = u*G + v*P. If Q is the point at infinity output FALSE
   and terminate.
   r' = Q.x mod q
   If r == r' output TRUE, else output FALSE

---

2.4 Standard ECDH key generation
This is equivalent to chapter 2.1.
2.5 Standard ECDH key exchange

---

Input: private key d, public key P of other party
Output: common secret point R
Procedure:
   Output R = d*P

---

2.6 Standard EC-Schnorr key generation
This is equivalent to chapter 2.1.
2.7 Standard EC-Schnorr signature generation

---

Input: private key d, message m
Output: signature parameters r, s
Procedure:
   Generate cryptographically secure random
   u in {1,2,...,q−1} (ephemeral key)
   Calculate Q = u*G
   r = hash(m || Q.x) (|| = concatenation). If r mod q == 0 restart.
   s = k + r*d mod q. If s == 0 restart.
   Output r, s

---

2.8 Standard EC-Schnorr signature verification

---

Input: public key P, message m, signature (r, s) to be verified
Output: TRUE if signature is valid, FALSE else
Procedure:
   Check whether r is in the correct range of the hash function
   and whether s is in {1,2,...,q−1}.
   If not output FALSE and terminate
   Q = s*G − r*P. If Q is the point at infinity output
   FALSE and terminate.
   r' = hash(m || Q.x) (|| = concatenation)
   If r == r' output TRUE, else output FALSE

---

PRIOR ART

The typical countermeasure to protect a (cryptographic) operation running in a White-Box context is obfuscation of critical parameters, for example secret keys, processed by the operation.

The prior art document [1] EP2553866A1 by Irdeto discloses a method for verification of a digital signature according to the DSA or ECDSA standard, said signature S comprised of an output pair S=(r, s), with r derived with use of a generator G, and s derived with use of a hash H(M) over a message M, a private key d and r. According EP2553866A1, the Signature S=(r, s) is calculated with transformed parameters. Generator G is transformed and thereby obfuscated by $f^{-1}$, and the secret key d is transformed and thereby obfuscated by f, with f being for both G and d the same secret number. The operations used to calculate r and s are concealed, and nevertheless provide the same result for S=(r, s) as compared to the corresponding non-concealed operations, since the obfuscation factor f internally cancels out.

The prior art document [2] EP3376705A1 by Philips discloses an electronic point multiplication device for computing a point multiplication on an elliptic curve between a multiplier k and a base point G on an elliptic curve E, for use in a cryptographic protocol, for example a ECDSA signature calculation. According to the solution of EP3376705A1, (i) multiple pre-computed auxiliary points Gi are derived from the base point G, and (ii) multiple derived hashes hi are derived from a hash h over a message M, and from these multiple blinded base multipliers are derived. The point multiplication k*G of the original base point G and an original multiplier k is calculated by calculating the point addition of: (i) the point multiplication of multiple blinded base multipliers with the original base point G; and (ii) multiple point multiplications of a blinded auxiliary multiplier and an auxiliary point Gi, wherein, blindings of the multiple blinded base multipliers in (i) and of the blinded auxiliary multipliers in (ii) can be weighted sums that correct each other, so as to achieve a correct total result k*G.

Document [3] EP3249520A1 of the prior art by NXP discloses a system and method for elliptic curve scalar multiplication between a scalar K and a base point G on an elliptic curve in an unsecure processor. Herein preparatory calculations are performed in a secure processor, wherein the scalar K is split into m2 random values ki, mask values are selected, and with the mask values the same number of elliptic curve points Gi as mask values are computed. Still in the secure processor, the scalar multiplication is performed, therein partly removing mask values previously applied. In the unsecure processor, precalculated derivates of the split-offs ki of the scalar K, and the pre-calculated elliptic curve points Gi are combined to m1 multiplied elliptic curve points Pi, and the multiplied elliptic curve points Pi and sent back to the secure processor.

Document [4] EP3125145A1 of the prior art by NXP discloses a method of obscuring software code implementing an elliptic curve cryptography ECC point multiplication function, wherein an ECC parameter, which is a multiplier d, is transformed into an array with −1, 0, and +1 values, while maintaining the same value for d; ECC point multiplication functions are generated using the transformed multipliers, wherein the generated ECC point multiplication function operations are split variable operations.

The [5] Paillier cryptosystem was originally presented at EUROCRYPT 1999: Pascal Paillier, "Public-Key Cryptosystems Based on Composite Degree Residuosity Classes", in Stern J. (eds) Advances in Cryptology—EUROCRYPT '99. Lecture Notes in Computer Science, vol 1592, Springer, Berlin, Heidelberg, 1999). There are two methods (scheme 1 and scheme 3) which describe a probabilistic asymmetric public key cryptosystem.

In [6] Yehuda Lindell's paper "Fast Secure Two-Party ECDSA signing" (IACR preprint server 2017/552) the Paillier cryptosystem is used to build a cryptographic protocol for generating an ECDSA signature by two parties. Each of them has a share of a ECDSA private key and is not able to perform a signing operation on its own, however the two parties together can jointly generate a ECDSA signature.

The documents [1]-[4] each disclose a method for performing a transformed or masked or blinded or obscured cryptographic operation, for use in an unsecure environment, thus in a White-Box environment. Each of the solutions [1] and [2] follow the principle of transforming or masking or blinding different parameters in mutual coordination, such that the transforming or masking or blinding cancels out in the total result. In [3], partial demasking in a secure environment is used, so as to guarantee a correct total result.

According to the solution of document [1] EP2553866A1, against with the present invention is delimited, the Signature S=(r, s) is calculated with obfuscated (in [1] called: transformed) parameters. Herein, an elaborate and mutually aligned transformation of the parameters is required. In [3] elaborate partial demasking is required.

OBJECTIVE OF THE INVENTION

It would be desirable to have a system or scheme which enables to compute cryptographic operations with masked, blinded, encrypted, transformed or otherwise obfuscated parameters, particularly the secret key d, similarly to computing with plaintext parameters which are not masked, blinded, encrypted, transformed or otherwise obfuscated.

Considering for example the computation of the EC-Schnorr signature component s, according to the rule s=k+ r*d mod q. If the key d is obfuscated to d #, then d #cannot be used directly in this computation. So the challenge is to calculate the parameter s without revealing the plain key d (and also the ephemeral key k). This means a sophisticated transformation of all involved parameters and doing calculations with the transformed parameters. At some points of the calculation a retransformation is necessary, e.g. at the end when the original parameter s is returned. Preferably such retransformations are executed very seldom and most parts of the calculation are done with transformed parameters which do not reveal the real plaintext value of the plain parameter.

It is an object of the present invention to provide a method and system for computing a cryptographic operation with obfuscated parameters, providing a similar result to the cryptographic operation with non-obfuscated parameters, without the necessity for case-by-case compensation measures.

SUMMARY OF THE INVENTION

The object of the invention is achieved by a system with the following features, as set out below. Embodiments of the invention are presented further below, and in dependent claims.

The invention provides a microprocessor device comprising an implementation of a cryptographic operation constructed to process parameters and generate an output. Herein, at least some of the parameters processed by the cryptographic operation are obfuscated, and more precisely obfuscated such that the cryptographic operation processes the obfuscated parameters (instead of the plaintext parameters as is the original cryptographic operation). The cryptographic operation can be an algorithm (detailed examples and embodiments of cryptographic operations will be described further below) and can include steps of encryption. The obfuscation of the parameters, which can be (but need not mandatorily be) an encryption as well, is a measure to turn the implementation into a White-Box implementation. The obfuscation is not part of the procedure or algorithm of the cryptographic operation, but a separate additional measure.

The invention is characterized in that the parameters which are obfuscated are obfuscated in that they are encrypted according to an additive homomorphic cryptographic system.

In the above-mentioned example of the EC-Schnorr signature component s=k+r*d mod q assume that k #and d #are the encryption of k resp. d using an additive homomorphic cryptosystem. Then the result s can be obtained by calculating s #=(k #)*(d #)$^r$ followed by a decryption of s #under that homomorphic cryptosystem and doing finally a reduction modulo q. When calculating s #we use the homomorphic property: An addition of plain parameters corresponds a certain group operation (here multiplication) of encrypted parameters. So the computation of s can be done without revealing the plain parameters k resp. d.

The advantage of using a homomorphic cryptosystem is that
1) the parameters are mathematically encrypted with a strong cryptosystem and not only obscured by techniques which are not mathematically strong,
2) it provides the possibility to do nearly all calculations with encrypted parameters (without revealing the plain secret parameters),
3) it provides an easy possibility to induce further random blinding values into the encrypted parameters,
4) the decrypt operation is only necessary at few parts of the calculation and this decrypt operation can be done with a fixed secured key.

The solution according to the invention thus achieves to compute cryptographic operations with masked, blinded, encrypted, transformed or otherwise obfuscated parameters, without the necessity for elaborate case-by-case alignment between different parameters or demasking as is required in the solutions known from the prior art.

According to an embodiment of the invention, the additive homomorphic cryptographic system comprises an encryption function Enc and a decryption function Dec fulfilling rule Dec(Enc(m))=m, and due to being additive homomorphic further fulfilling the rule Dec(Enc($m_1$)*Enc ($m_2$))=$m_1$+$m_2$.

In combination with the invention, encrypted is meant to say processed by an encryption function Enc and decrypted is meant to say processed by a decryption function Dec.

According to an embodiment of the invention, the additive homomorphic cryptographic system is embodied as the Paillier cryptographic system. Other cryptographic systems having additive homomorphic property are generally suited for use in the invention as well. However, the Paillier cryptographic system has a relatively low complexity as compared to some other suited cryptographic systems. The relatively low complexity facilitates the creation of an obfuscated implementation of a cryptographic operation. This particularly holds if not only one parameter, but several parameters or even all parameters of a cryptographic operation are obfuscated.

It is emphasized here that the microprocessor system comprises two different interleaved cryptographic systems, namely first an operational cryptographic system implementing the cryptographic operation (e.g. key generation, signature generation, key exchange) and second an obfuscation cryptographic system (the additive homomorphic cryptographic system, e.g. Paillier cryptographic system). So the usage of the additive homomorphic cryptographic system (e.g. Paillier or similar suitable cryptosystem) results in a White-Box secured implementation of the operational cryptographic system.

According to embodiments of the invention, the Paillier cryptographic system comprises: (1) a public encryption key comprised of a pair {n, g} and (2) a private decryption key comprised of a pair {$\lambda$, $\mu$} or {$\alpha$, $\mu$}. Herein, the Paillier cryptosystem can be embodied either as scheme 1, with the private decryption key comprised of a pair {$\lambda$, $\mu$}, or as scheme 3, with the private decryption key comprised of a pair {$\alpha$, $\mu$}.

According to embodiments of the invention, depending on the type of cryptographic operation—for example key generation, key exchange or signature generation—the parameters to be processed by the cryptographic operation or the output comprise at least a secret key—e.g. key d or key d1 as set out further below. Herein, for example in key generation, key exchange and signature generation, at least the secret key is obfuscated in that the secret key is encrypted (by a encrypt function) according to the additive homomorphic cryptographic system. Alternatively to or in addition to the secret key, a value derived from the secret key is obfuscated in that the value derived from the secret key is encrypted (by a encrypt function) according to the additive homomorphic cryptographic system. Examples of such derived value derived from a secret key are the values v1 and v2 of a signature generation as set out further below. Detailed examples of obfuscated parameters of obfuscated (White-Box) operations embodied as key generation, signature generation and key exchange are given further below.

According to embodiments of the invention, the operational cryptographic system comprises at least one pre-calculated parameter processed in the cryptographic operation, and wherein at least the pre-calculated parameter is obfuscated in that the random number or/and a value derived from the pre-calculated parameter is encrypted according to the additive homomorphic cryptographic system. In a key generation process or key exchange process, examples of pre-calculated parameters are the parameters ci and m1 as set out further below. In signature generation process, examples of pre-calculated parameters are the parameters fj and m2, as set out further below. In a signature generation process, an example of a derived parameter derived from a pre-calculated value is the parameter v1. Some derived parameters can be derived from both a secret key and a pre-calculated parameter.

According to embodiments of the invention, the operational cryptographic system is either one of an elliptic curve EC based or non-elliptic-curve based systems, particularly either one of the following: ECDSA; EC-Schnorr; EC Diffie Hellman ECDH; EdDSA, ECGDSA, KCDSA, SM2; DSA; Schnorr signature scheme; ElGamal signature scheme; Diffie Hellman DH key exchange. Detailed embodiments for many of the exemplary operational cryptographic systems listed above are given further below.

According to some embodiments of the invention, the cryptographic operation is a key generation operation according to an operational cryptographic system (e.g. ECDSA, ECDH, EC-Schnorr), with the output being a cryptographic key (for example d; d1), and with at least the output cryptographic key being encrypted according to said additive homomorphic cryptographic system. Alternatively, or in addition, one or more parameters derived from such a cryptographic key, or one or more pre-calculated parameters or one or more values derived from a pre-calculated parameter are obfuscated by encryption with the additive homomorphic cryptographic system, as set out above.

According to further embodiments of the invention, the cryptographic operation is a cryptographic signature generation operation according to an operational cryptographic system (e.g. ECDSA, EC-Schnorr) constructed to generate a cryptographic signature, for example {r, s} as in the examples below, based on a secret key (e.g. d; d1), with the output being the cryptographic signature {r,s}, and with at least the secret key or/and a value derived from the secret key (in signature generation for example v1, v2) being encrypted according to said additive homomorphic cryptographic system. Alternatively, or in addition, one or more parameters derived from such a cryptographic key, or one or more pre-calculated parameters or one or more values derived from a pre-calculated parameter are obfuscated by encryption with the additive homomorphic cryptographic system, as set out above.

According to further embodiments of the invention, the cryptographic operation is a key exchange operation between at least two or more different parties according to an operational cryptographic system (e.g. ECDH), with the output being a common secret key (R) shared between the different parties and calculated based on an own secret key (d; d1) and a public key (P) of the other party, and with at least the secret key (d; d1) of each party being encrypted according to said additive homomorphic cryptographic. Alternatively, or in addition, one or more parameters derived from such a cryptographic key, or one or more pre-calculated parameters or one or more values derived from a pre-calculated parameter are obfuscated by encryption with the additive homomorphic cryptographic system, as set out above.

The microprocessor device can, according to some embodiments, comprise several cryptographic operations as above, besides or in combination with each other.

According to some embodiments, the microprocessor device can comprise both of a key generation operation and a key exchange operation. This is for example a preferred combination in case the cryptographic operation is according to the operational cryptographic system EC-Diffie-Hellman ECDH.

According to some embodiments, the microprocessor device can comprise all of a key generation operation, a signature generation operation and a signature verification operation. This is for example a preferred combination in case the cryptographic operation is according to the operational cryptographic system ECDSA or EC-Schnorr. Herein, preferably, the signature verification operation uses only public key parameters. So no additional encryption of the parameters of the operation for obfuscating them is required. Thus it is sufficient of obfuscate parameters of the key generation operation and the signature generation operation.

The invention also provides for a method for implementing, in a microprocessor device, an obfuscated cryptographic operation constructed to process obfuscated parameters and generate an output, comprising the steps:
- providing the microprocessor device with a partial implementation of the cryptographic operation lacking at least some parameters,
- obfuscating the lacking at least some parameters in a processing device (e.g. a PC or computer or server or hardware security module HSM) outside the microprocessor device and transferring the obfuscated parameters from the processing device to the microprocessor device,
- implementing the lacking obfuscated parameters in the partial implementation so as to generate the obfuscated cryptographic operation.

The method is characterized in that the parameters which are obfuscated are obfuscated in that they are encrypted according to an additive homomorphic cryptographic system, e.g. the Paillier cryptosystem or a different suitable additive homomorphic cryptosystem.

In the method, according to some embodiments, the additive homomorphic cryptographic system comprises an encryption function Enc and a decryption function Dec, wherein at least some or all of the encryptions functions Enc under the additive homomorphic cryptographic system are calculated outside the microprocessor device, for example in a Personal Computer PC or computer or server or hardware security module HSM.

After the obfuscated cryptographic operation has been implemented in the microprocessor device, the microprocessor device can be operated, so as to execute the cryptographic operation and generate the output. Herein, the cryptographic operation calculates with externally pre-calculated obfuscated parameters that are obfuscated according to the additive homomorphic cryptographic system. With respect to parameters defined as sufficiently critical (e.g. secret key or/and pre-calculated values or values derived therefrom) The microprocessor device doesn't calculate with plaintext versions of these parameters, however only with obfuscated parameters obfuscated by encryption under the additive homomorphic cryptographic system. Thus, possible side channel information generated by the microprocessor device while it operates is reduced or minimized or prevented.

The executed cryptographic operation executed in the microprocessor device is, according to embodiments of the invention, key generation, key exchange or signature generation.

The Paillier Cryptosystem

In the following, the Paillier cryptosystem will be described. The Paillier cryptosystem provides two different schemes particularly suited for use in the invention, namely scheme 1 and scheme 3. Scheme 1 will be fully described. Scheme 3 will be described based on the description for scheme 1, highlighting the differences between scheme 1 and scheme 3. Further below, embodiments of the invention in different cryptosystems will be described.

3.1 Paillier cryptosystem setup (scheme 1)

Choose two different prime numbers $p_1$ and $p_2$ such that their product $n=p_1*p_2$ is coprime to $\Phi(n)=(p_1-1)*(p_2-1)$ and n is large enough to resist factoring. All encrypted values will be elements in the multiplicative subgroup $\Gamma=(\mathbb{Z}/(n^2))^x$ of $\mathbb{Z}/(n^2)$, which has order $ord(\Gamma)=n*\Phi(n)$.

Note that the n-th roots of unity form a subgroup $U \subset \Gamma$ with $ord(U)=n$ and consist of all elements $(1+n)^x \mod n^2 = (1+x*n) \mod n^2$, $0 \leq x < n$. For any element u in U define the function $L(u)=(u-1)/n$.

Select a random element g in $\Gamma$ with order $ord(g)=\alpha*n$, $\alpha>0$.

Let $\lambda=lcm(p_1-1, p_1-1)$ with lcm=least common multiple. Then $g^\lambda \mod n^2$ is a n-th root of unity and $\mu=L(g^\lambda \mod n^2)$ is coprime to n.

The public encryption key is the pair (n, g).
The private decryption key is the pair $(\lambda, \mu)$.

3.2 Paillier encryption (scheme 1)

---

Input: public encryption key (n, g), message $0 \leq m < n$
Output: c = Paillier-Enc(m) $\in \Gamma$
Procedure:

-continued

Select a random number $0 \leq t < n$ which is coprime to n.
Calculate $c = g^m * t^n \mod n^2$
Output c

3.3 Paillier decryption (scheme 1)

Input: private decryption key $(\lambda, \mu)$, public modulus n, encrypted cipher text $c \in \Gamma$
Output: plain text message m = Paillier-Dec(c)
Procedure:
    Output $m = L(c^\lambda \mod n^2) / \mu \mod n$ 3.4 Properties of the Paillier cryptosystem
This chapter describes all properties of the Paillier cryptosystem which are used by the G+D white-box ECC implementation.
  (3.4.1)  Paillier-Dec(Paillier-Enc($m_1$)*Paillier-Enc($m_2$) mod $n^2$)=$m_1+m_2$ mod n,
    i.e. the product of two cipher texts will decrypt to the sum of their corresponding plain texts.
    If n is chosen in a way such that $m_1+m_2<n$, then the modulo reduction on the right hand side of the equation can be omitted.
  (3.4.2) Paillier-Dec(Paillier-Enc($m_1$)$^k$ mod $n^2$)=k*$m_1$ mod n,
    i.e. the exponentiation of a cipher text with a number will decrypt to the product of the corresponding plain text with this number.
    If n is chosen in a way such that k*$m_1<n$, then the modulo reduction on the right hand side of the equation can be omitted.
  (3.4.3) L(Paillier-Enc(m/$\mu$ mod n)$^\lambda$ mod $n^2$)=m mod n,
    i.e. decrypting Paillier-Enc(m/$\mu$ mod n) consists of an exponentiation with the secret exponent $\lambda$, a decrement by 1 and a final multiplication with the public parameter 1/n mod $2^{bitlen(n)}$.

So additions and many multiplications in the ECC implementation can be replaced by modular multiplications and exponentiations with the corresponding encrypted parameters.

Scheme 3 of the Paillier cryptosystem offers a faster decryption function. In the following we will describe briefly the differences:
  Instead of working in the whole group $\Gamma=(\mathbb{Z}/(n^2))^*$ the scheme works in a subgroup $<g> \subset \Gamma$ generated by an element g of order ord(g)=$\alpha*n$, $\alpha|\lambda$.
  The private key is the pair $(\alpha, \mu)$ with $\mu=L(g^\alpha \mod n^2)$
  Encryption: $c=g^{m+t*n} \mod n^2$ with a random number $0 \leq t < n$.
  Decryption: $m=L(c^\alpha \mod n^2)/\mu \mod n$
  The secret key parameter $\alpha$ needs to be sufficiently large to prevent the common cryptanalytic attacks but it can be chosen much smaller than $\lambda$.
  The equations (3.4.1), (3.4.2) and (3.4.3) also hold for scheme 3, where $\lambda$ has to be replaced by $\alpha$ in (3.4.3).

The invention is applicable to different cryptographic systems, for example ECDSA, ECDH and the EC-Schnorr crypto system. The invention is particularly applicable to cryptographic operations on an elliptic curve comprise for example: ECDSA key generation; ECDSA signature generation; ECDSA signature verification; ECDH key generation; ECDH key exchange; EC-Schnorr key generation; EC-Schnorr signature generation; EC-Schnorr signature verification. The invention as embodied in the above listed examples of known cryptographic operations on an elliptic curve will be explained in detail in the following. The main ideas of this invention as exemplarily described hereafter can also be used for a white-box implementation of other ECC based crypto systems such as EdDSA, ECGDSA, KCDSA, SM2, EC based encryption systems and key agreement protocols. The invention is also applicable to further examples of cryptographic operations, and herein with or without elliptic curve context.

DETAILED DESCRIPTION OF THE INVENTION

A White-Box (=obfuscated) ECDSA key generation procedure is as an example of a cryptographic operation according to an embodiment of the invention. Further examples of cryptographic operations such as key agreement and signature generation are shown without reference to drawings. Further, signature verification operations corresponding to the signature generation procedures are disclosed.

Below we will describe how Paillier encryption can be used to build a white-box ECC implementation, according to embodiments of the invention.
  All Paillier encryptions are done outside the device. The encrypted parameters are transferred to the device in an initial setup phase.
  Further the public modulus n and some other useful values (e.g. 1/n mod $2^{bitlen(n)}$) are preferably transferred to the device. The generator g needs not be transferred as it is not needed for on device calculations.
  The device performs modular multiplications respectively modular exponentiations with the Paillier encrypted parameters. This corresponds to additions respectively multiplications of the unencrypted parameters. The size of the Paillier modulus n is carefully chosen such that the result of these additions resp. multiplications is always smaller than n.
  At some points in the implementation a Paillier decryption Dec of blinded values is required, for example for generating a final result to be output. The Paillier decryption can for example be realized as an on-device white-box secured exponentiation with the fixed secret $\lambda$ resp. $\alpha$. Such an exponentiation can for example be provided by a white-box secure RSA implementation. The White-Box secured exponentiation with the secret exponent lambda or alpha is for example required to quit (or leave) the Paillier-encryption scheme, in cases where such quitting (or leaving) is required, for example in calculation of the final result of the cryptographic operation, or in some cases for some intermediate results.
  If an encrypted parameter Paillier-Enc(m/$\mu$ mod n) has to be decrypted on the device, then the parameter $\mu$ is not needed (see (3.4.3)). If all on-device Paillier decryptions don't need $\mu$, then this parameter need not be transferred to the device. Otherwise a white-box secured multiplication with 1/$\mu$ mod n is needed on the device.
  The white-box secured secret exponent $\lambda$ resp. $\alpha$ is also transferred to the device (and optionally the white-box secured parameter 1/$\mu$ mod n). The White-Box secured exponentiation with the secret exponent lambda or alpha is required to quit or leave the Paillier-encryption scheme, in cases where such quitting or leaving is required, for example in calculation of the final result of the cryptographic operation, or for some intermediate results.

In the following we will present possible implementations for ECDSA, ECDH and the EC-Schnorr crypto system. The main ideas of this description can also be used for a white-box implementation of other ECC based crypto systems such as EdDSA, ECGDSA, KCDSA, SM2, EC based encryption schemes and key agreement protocols, or other cryptosystems such as DSA, ElGamal signature scheme, Schnorr signature scheme, Diffie Hellman key exchange. Further the proposed descriptions can be modified as compared to the described way by using the homomorphic properties of the Paillier crypto system.

2.1 White-box ECDSA key generation (4.1.Setup) Setup Outside the Device

Generate Paillier encryption parameters $n_1, \lambda_1$ resp. $\alpha_1, \mu_1$ as described in chapter 3.

Generate a random number $0 < m_1 < q$.

Generate a large table of random numbers $0 \leq c_i < q$.

Calculate the curve points $K_i = c_i * G$.

Paillier encryption of $c_i/m_1 \bmod q$:

Generate randomised $k_i \in \Gamma_1$ with Paillier-Dec($k_i$)mod $q = c_i/m_1 \bmod q$.

Paillier encryption of 1:

Generate randomised $l_1 \in \Gamma_1$ with Paillier-Dec($l_1$)mod $q=1$.

(4.1.Transfer) Transfer to the Device

Public Paillier parameter $n_1$

White-box secured secret Paillier parameters $\lambda_1$ resp. $\alpha_1$ (and optionally $1/\mu_1 \bmod n_1$)

Curve points $K_i$ and Paillier encrypted parameters $k_i$ $l_1$=Paillier encrypted 1

Obfuscated parameter $m_1$ (4.1.Calc) Calculation on the Device

---

Input:
  Parameters $n_1, K_i, k_i$ of (4.1.Transfer)
Procedure:
  Generate random numbers rand[i]
  Calculate the curve point $P = \Sigma_i \text{ rand}[i] * K_i$. If P is the point at infinity restart.
  Calculate $d_1 = \Pi_i k_i^{\text{rand}[i]} \bmod n_1^2$
Output:
  Encrypted secret key $d_1$ and public key P
Remark:
  The generated secret key d is $(\Sigma_i \text{ rand}[i] * c_i) \bmod q$
  Paillier-Dec($d_1$) mod q = d / $m_1$ mod q

---

2.2 White-box ECDSA signature generation (4.2.Setup) Setup Outside the Device

The following parameters are used for the calculation of the ephemeral key in the ECDSA signature generation.

Generate Paillier encryption parameters $n_2, \lambda_2$ resp. $\alpha_2, \mu_2$ as described in chapter 3.

Generate a random number $0 < m_2 < q$.

Generate a large table of random numbers $0 \leq f_j < q$.

Calculate the curve points $E_j = f_j * G$.

Paillier encryption of $f_j * m_2 \bmod q$: Generate randomised $e_j \in \Gamma_2$ with Paillier-Dec($e_j$) mod $q = f_j * m_2 \bmod q$.

(4.2.Transfer) Transfer to the Device

Public Paillier parameter $n_2$

White-box secured secret Paillier parameters $\lambda_2$ resp. $\alpha_2$ (and optionally $1/\mu_2 \bmod n_2$)

Curve points $E_j$ and Paillier encrypted parameters $e_j$

Obfuscated parameter $m_2$ (4.2.Calc) Calculation on the Device

---

Input:
  Parameters $n_1, \lambda_1$ resp. $\alpha_1$, optionally $1/\mu_1$ mod $n_1$, $l_1$, $m_1$ of (4.1.Transfer)
  Encrypted secret key $d_1$ generated in (4.1.Calc)
  All parameters of (4.2.Transfer)
  hash(m) of message m
Procedure:
  Generate random numbers rand[j]
  Calculate the curve point $Q = \Sigma_j \text{ rand}[j] * E_j$.
  If Q is the point at infinity restart.
  Calculate the encrypted ephemeral key $u_2 = \Pi_j e_j^{\text{rand}[j]} \bmod n_2^2$
  Calculate the 1$^{st}$ signature parameter r = Q.x mod q.
  If r == 0 restart.
  Generate two random numbers $z_1$ and $z_2$ and calculate
  $z = z_1 * z_2 \bmod q$.
  If z == 0 repeat the generation of $z_1$ and $z_2$.
  Modular exponentiation with exponent z:
  Calculate $v_2 = u_2^z \bmod n_2^2$
  Calculate Paillier-Dec($v_2$)
  $w_2$ = Paillier-Dec($v_2$) mod q
  Calculate $h_1 = (\text{hash}(m) * z_1) * m_2 \bmod q$
  Calculate $r_1 = ((r * z_1) * m_1) * m_2 \bmod q$
  Calculate $v_1 = (l_1)^{h_1} * (d_1)^{r_1} \bmod n_1^2$
  Calculate Paillier-Dec($v_1$)
  $w_1$ = Paillier-Dec($v_1$) mod q
  Calculate the 2$^{nd}$ signature parameter s = $(w_1 / w_2) * z_2 \bmod q$. If s == 0 restart.
Output:
  Signature parameters r, s
Remark:
  The used ephemeral key u is $(\Sigma_j \text{ rand}[j] * f_j) \bmod q$
  Paillier-Dec($u_2$) mod q = u * $m_2$ mod q.
  $w_2$ = Paillier-Dec($v_2$) mod q = u * $m_2$ * $z_1$ * $z_2$ mod q
  $w_1$ = Paillier-Dec($v_1$) mod q = (h + r*d) * $m_2$ * $z_1$ mod q

---

(4.2.Calc) describes a procedure using a key which was generated on the device. Of course it is also possible to use a key d which was generated outside the device. In this case use the following setup for the encryption of d.

(4.2.SetupKey) Setup outside the device used for extern. generated secret key d

Generate Paillier encryption parameters $n_3, \lambda_3$ resp. $\alpha_3, \mu_3$ as described in chapter 3.

Generate a random number $0 < m_3 < q$.

Paillier encryption of $d/m_3 \bmod q$:

Generate randomised $d_3 \in \Gamma_3$ with Paillier-Dec($d_3$)mod $q = d/m_3 \bmod q$.

Paillier encryption of 1:

Generate randomised $l_3 \in \Gamma_3$ with Paillier-Dec($l_3$)mod $q=1$.

Then all parameters of (4.2.SetupKey) are used as input parameters for (4.2.Calc) instead of the parameters of (4.1.Transfer) and (4.1.Calc).

2.3 ECDSA signature verification

This function uses only public key parameters. So no additional encryption of these parameters is required.

2.4 White-box ECDH key generation (4.4.Setup) Setup Outside the Device

This procedure is similar to (4.1. Setup) with one exception: The cofactor h is additionally included into the calculations.

Generate Paillier encryption parameters $n_1, \lambda_1$ resp. $\alpha_1, \mu_1$ as described in chapter 3.

Generate a random number $0 < m_1 < q$.

Generate a large table of random numbers $0 \leq c_i < q$.

Calculate the curve points $K_i = c_i * G$.

Paillier encryption of $c_i/(h*m_1) \bmod q$: Generate randomised $k_i \in \Gamma_1$ with Paillier-Dec($k_i$)mod $q = c_i/(h*m_1) \bmod q$.

Paillier encryption of 1:

Generate randomised $l_1 \in \Gamma_1$ with Paillier-Dec($l_1$)mod $q=1$.

(4.4.Transfer) Transfer to the Device
Public Paillier parameter $n_1$
White-box secured secret Paillier parameters $\lambda_1$ resp. $\alpha_1$
  (and optionally $1/\mu_1$ mod $n_1$)
Curve points $K_i$ and Paillier encrypted parameters $k_i$
$1_1$=Paillier encrypted 1
Obfuscated parameter $m_1$
(4.4.Calc) Calculation on the Device

---

Input:
  Parameters $n_1$, $K_i$, $k_i$ of (4.4.Transfer)
Procedure:
  Generate random numbers rand[i]
  Calculate the curve point $P = \Sigma_i$ rand[i] * $K_i$.
  If P is the point at infinity restart.
  Calculate $d_1 = \Pi_i\ k_i^{rand[i]}$ mod $n_1^2$
Output:
  Encrypted secret key $d_1$ and public key P
Remark:
  The generated secret key d is ($\Sigma_i$ rand[i] * $c_i$) mod q
  Paillier-Dec($d_1$) mod q = d / (h*$m_1$) mod q

---

2.5 White-box ECDH key exchange
(4.5.Calc) Calculation on the Device

---

Input:
  Parameters $n_1$, $\lambda_1$ resp. $\alpha_1$, optionally $1\mu_1$
  mod $n_1$, $l_1$, $m_1$ of (4.4.Transfer)
  Encrypted secret key $d_1$ generated in (4.4.Calc)
  Public key P of other party
Procedure:
  Calculate the curve point Q = h*P
  Generate random number z and calculate $z_1$ = z * $m_1$ mod q
  Calculate the curve point $Q_1 = z_1$*Q
  Calculate $v_1 = (l_1)^z * d_1$ mod $n_1^2$
  Calculate Paillier-Dec($v_1$)
  Calculate $w_1$ = Paillier-Dec($v_1$) mod q and $x_1 = w_1 * m_1$ mod q
  Calculate R = $x_1$*Q − $Q_1$
Output:
  Common secret point R
Remark:
  $w_1$ = Paillier-Dec($v_1$) mod q = z + d/(h*$m_1$) mod q
  $x_1$ = z + d/h mod q

---

(4.5.Calc) describes a procedure using a key which was generated on the device. Of course it is also possible to use a key d which was generated outside the device. In this case use the following setup for the encryption of d.

(4.5.SetupKey) Setup outside device used for externally generated secret key d

Generate Paillier encryption parameters $n_3$, $\lambda_3$ resp. $\alpha_3$, $\mu_3$ as described in chapter 3.
  Generate a random number 0<$m_3$<q.
  Paillier encryption of d/(h*$m_3$)mod q: Generate randomised $d_3 \in \Gamma_3$ with Paillier-Dec($d_3$)mod q=d/(h*$m_3$) mod q.
  Paillier encryption of 1:
  Generate randomised $l_3 \in \Gamma_3$ with Paillier-Dec($l_3$)mod q=1.

Then all parameters of (4.5.SetupKey) are used as input parameters for (4.5.Calc) instead of the parameters of (4.4.Transfer) and (4.4.Calc).

2.6 White-box EC-Schnorr key generation
(4.6.Setup) Setup Outside the Device
Identical to (4.1. Setup) with one exception: $l_1$ is not needed
(4.6.Transfer) Transfer to the Device
Identical to (4.1.Transfer) with one exception: $l_1$ is not needed (4.6.Calc) Calculation on the Device
Identical to (4.1.Calc)

2.7 White-box EC-Schnorr signature generation
(4.7.Setup) Setup Outside the Device
The following parameters are used for the calculation of the ephemeral key in the EC-Schnorr signature generation. This function is similar to (4.2.Setup) with one exception: Use ($1/m_2$ mod q) instead of $m_2$ for Paillier encryption.

Generate Paillier encryption parameters $n_2$, $\lambda_2$ resp. $\alpha_2$, $\mu_2$ as described in chapter 3.
  Generate a random number 0<$m_2$<q.
  Generate a large table of random numbers 0≤$f_j$<q.
  Calculate the curve points $E_j = f_j$*G.
  Paillier encryption of $f_j/m_2$ mod q: Generate randomised $e_j \in \Gamma_2$ with Paillier-Dec($e_j$)mod q=$f_j/m_2$ mod q.

(4.7.Transfer) Transfer to the Device
Public Paillier parameter $n_2$
White-box secured secret Paillier parameters $\lambda_2$ resp. $\alpha_2$
  (and optionally $1/\mu_2$ mod $n_2$)
Curve points $E_j$ and Paillier encrypted parameters $e_j$
Obfuscated parameter $m_2$
(4.7.Calc) Calculation on the Device

---

Input:
  Parameters $n_1$, $\lambda_1$ resp. $\alpha_1$, optionally $1\mu_1$
  mod $n_1$, $m_1$ of (4.6.Transfer)
  Encrypted secret key $d_1$ generated in (4.6.Calc)
  All parameters of (4.7.Transfer)
  message m
Procedure:
  Generate random numbers rand[j]
  Calculate the curve point Q = $\Sigma_j$ rand[j] * $E_j$.
  If Q is the point at infinity restart.
  Calculate the encrypted ephemeral key $u_2 = \Pi_j\ e_j^{rand[j]}$ mod $n_2^2$
  Calculate the $1^{st}$ signature parameter r = hash(m ∥ Q.x).
  If r mod q == 0 restart.
  Generate a random number z which is coprime to q.
  Calculate $z_2$ = z * $m_2$ mod q.
  Modular exponentiation with exponent $z_2$:
  Calculate $v_2 = u_2^{z_2}$ mod $n_2^2$
  Calculate Paillier-Dec($v_2$)
  $w_2$ = Paillier-Dec($v_2$) mod q
  Calculate $r_1$ = (r * z) * $m_1$ mod q
  Modular exponentiation with exponent $r_1$:
  Calculate $v_1 = d_1^{r_1}$ mod $n_1^2$
  Calculate Paillier-Dec($v_1$)
  $w_1$ = Paillier-Dec($v_1$) mod q
  Calculate $2^{nd}$ signature parameter s = ($w_1 + w_2$) / z mod q.
  If s == 0 restart.
Output:
  Signature parameters r, s
Remark:
  The used ephemeral key u is ($\Sigma_j$ rand[j] * $f_j$) mod q
  Paillier-Dec($v_2$) mod q = u / $m_2$ mod q.
  $w_2$ = Paillier-Dec($u_2$) mod q = u * z mod q
  $w_1$ = Paillier-Dec($v_1$) mod q = r * d * z mod q

---

(4.7.Calc) describes a procedure using a key which was generated on the device. Of course it is also possible to use a key d which was generated outside the device. In this case use the following setup for the encryption of d.

(4.7.SetupKey) Setup outside the device used for externally generated secret key d Generate Paillier encryption parameters $n_3$, $\lambda_3$ resp. $\alpha_3$, $\mu_3$ as described in chapter 3.
  Generate a random number 0<$m_3$<q.
  Paillier encryption of d/$m_3$ mod q:
  Generate randomised $d_3 \in \Gamma_3$ with Paillier-Dec($d_3$)mod q=d/$m_3$ mod q.

Then all parameters of (4.7.SetupKey) are used as input parameters for (4.7.Calc) instead of the parameters of (4.6.Transfer) and (4.6.Calc).

If the Paillier parameters for the secret key ($n_1$, $\lambda_1$ resp. $\alpha_1$, ...) are identical to those of the ephemeral key ($n_2$, $\lambda_2$ resp. $\alpha_2$, ...), then (4.7.Calc) can be replaced by the following procedure which needs only one Paillier decryption.

(4.7.Calc') Calculation on the device if ($n_1$, $\lambda_1$ resp. $\alpha_1$, ...)=($n_2$, $\lambda_2$ resp. $\alpha_2$, ...)

---

Input:
  Parameters $n_1$, $\lambda_1$ resp. $\alpha_1$, optionally $1\mu_1$ mod $n_1$, $m_1$ of (4.6.Transfer)
  Encrypted secret key $d_1$ generated in (4.6.Calc)
  All parameters of (4.7.Transfer)
  message m
Procedure:
  Generate random numbers rand[j]
  Calculate the curve point $Q = \Sigma_j$ rand[j] * $E_j$.
  If Q is the point at infinity restart.
  Calculate the encrypted ephemeral key $u_1 = \Pi_j \, e_j^{rand[j]}$ mod $n_1^2$
  Calculate the $1^{st}$ signature parameter r = hash(m $\|$ Q.x).
  If r mod q == 0 restart.
  Calculate $v_1 = u_1 * (d_1)^r$ mod $n_1^2$
  Generate a random number z which is coprime to q.
  Calculate $z_1 = z * m_1$ mod q.
  Modular exponentiation with exponent $z_1$: Calculate $x_1 = u_1^{z_1}$ mod $n_1^2$
  Calculate Paillier-Dec($x_1$)
  Calculate $2^{nd}$ signature parameter s = Paillier-Dec($x_1$) / z mod q. If s == 0 restart.
Output:
  Signature parameters r, s
Remark:
  The used ephemeral key u is ($\Sigma_j$ rand[j] * $f_j$) mod q
  Paillier-Dec($u_1$) mod q = u / $m_1$ mod q
  Paillier-Dec($v_1$) mod q = (u + r*d) / $m_1$ mod q
  Paillier-Dec($w_1$) mod q = (u + r*d) * z mod q

---

2.8 EC-Schnorr signature verification

This function uses only public key parameters. So no additional encryption of these parameters is required.

What is claimed is:

1. A microprocessor device comprising an implementation of a cryptographic operation constructed to process parameters and generate an output,
wherein at least some of the parameters are obfuscated such that the cryptographic operation processes the obfuscated parameters,
wherein the parameters which are obfuscated are obfuscated in that they are encrypted according to an additive homomorphic cryptographic system,
wherein the parameters to be processed by the cryptographic operation comprises at least a secret key (d), and
wherein at least the secret key (d) is obfuscated in that the secret key (d) is encrypted according to the additive homomorphic cryptographic system.

2. The microprocessor device according to claim 1, wherein the additive homomorphic cryptographic system comprises an encryption function Enc and a decryption function Dec fulfilling the rule Dec(Enc(m))=m, and fulfilling the rule Dec(Enc(m1)*Enc(m2))=m1+m2.

3. The microprocessor device according to claim 1, wherein the additive homomorphic cryptographic system is embodied as the Paillier crypto-graphic system.

4. The microprocessor device according to claim 3, wherein the Paillier cryptographic system comprises:
(1) a public encryption key comprised of a pair {n, g} and
(2) a private decryption key comprised of a pair {$\lambda$, $\mu$} or {$\alpha$, $\mu$}.

5. The microprocessor device according to claim 1, wherein a value (v1) derived from the secret key (d) is obfuscated in that the value (v1) derived from the secret key (d) is encrypted according to the additive homomorphic cryptographic system.

6. The microprocessor device according to claim 1, wherein the operational cryptographic system comprises at least one pre-calculated parameter (ci, m1; fj, m2) processed in the cryptographic operation, and
wherein at least the pre-calculated parameter is obfuscated in that the pre-calculated parameter or/and a value (v1) derived from the pre-calculated parameter is encrypted according to the additive homomorphic cryptographic system.

7. The microprocessor device according to claim 6, wherein the at least one pre-calculated parameter is either one of:
at least one pre-calculated parameter calculated outside the device and provided to the device for later on-device key generation; or
at least one pre-calculated parameter (fj *m2 mod q; fj/m2 mod q) calculated outside the device and provided to the device for later on-device calculation of an ephemeral key (ui) used in a calculation of a signature.

8. The microprocessor device according to claim 1, wherein the operational cryptographic system is either one of an elliptic curve EC based or non-elliptic-curve based systems, particularly either one of the following: ECDSA; EC-Schnorr; EC Diffie Hellman ECDH; EdDSA, ECGDSA, KCDSA, SM2; DSA; Schnorr signature scheme; ElGamal signature scheme; Diffie Hellman DH key exchange.

9. The microprocessor device according to claim 2, wherein the cryptographic operation is either one of:
a key generation operation according to an operational cryptographic system, with the output being a cryptographic key, and with at least the output cryptographic key being encrypted according to said additive homomorphic cryptographic system; or
a cryptographic signature generation operation according to an operational cryptographic system constructed to generate a cryptographic signature {r, s} based on a secret key (d), with the output being the cryptographic signature {r,s}, and with at least the secret key (d) or/and a value (v1) derived from the secret key (d) being encrypted according to said additive homomorphic cryptographic system; or
a key exchange operation between different parties according to an operational cryptographic system, with the output being a common secret key (R) shared between the different parties and calculated based on an own secret key (d) and a public key (P) of the other party, and with at least the secret key (d) of each party being encrypted according to said additive homomorphic cryptographic system.

10. A method for implementing, in a microprocessor device, an obfuscated cryptographic operation constructed to process obfuscated parameters and generate an output, comprising the steps:
providing the microprocessor device with a partial implementation of the cryptographic operation lacking at least some parameters,
obfuscating the lacking at least some parameters in a processing device outside the microprocessor device and transferring the obfuscated parameters from the processing device to the microprocessor device,
implementing the lacking obfuscated parameters in the partial implementation so as to generate the obfuscated cryptographic operation, wherein the obfuscated parameters are obfuscated in that they are encrypted according to an additive homomorphic cryptographic system, wherein the parameters to be processed by the cryptographic operation comprise at least a secret key (d), wherein at least the secret key (d) is obfuscated in that the secret key (d) is encrypted according to the additive homomorphic cryptographic system.

11. The method according to claim 10, wherein the additive homomorphic cryptographic system comprises an encryption function Enc and a decryption function Dec, and wherein at least some or all of the encryption functions Enc under the additive homomorphic cryptographic system are calculated outside the microprocessor device.

* * * * *